(12) United States Patent
Park et al.

(10) Patent No.: US 8,700,810 B2
(45) Date of Patent: Apr. 15, 2014

(54) SEMICONDUCTOR DEVICES CAPABLE OF DIVIDING ENDPOINT INTO MAJORITY OF SUB-ENDPOINTS

(75) Inventors: Sung Geun Park, Gyeonggi-do (KR); Chul Joon Choi, Gyeonggi-do (KR); Keon Han Sohn, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 318 days.

(21) Appl. No.: 12/718,138

(22) Filed: Mar. 5, 2010

(65) Prior Publication Data
US 2010/0228896 A1 Sep. 9, 2010

(30) Foreign Application Priority Data
Mar. 5, 2009 (KR) .................. 10-2009-0018847

(51) Int. Cl.
*G06F 3/00* (2006.01)

(52) U.S. Cl.
USPC .......... 710/8; 710/9; 710/12; 710/14; 710/36; 710/62; 710/72

(58) Field of Classification Search
None
See application file for complete search history.

(56) References Cited

U.S. PATENT DOCUMENTS

| 5,818,948 | A | * | 10/1998 | Gulick | 381/77 |
| 5,841,471 | A | * | 11/1998 | Endsley et al. | 348/231.6 |
| 6,122,676 | A | * | 9/2000 | Brief et al. | 710/9 |
| 6,148,354 | A | * | 11/2000 | Ban et al. | 710/301 |
| 6,795,872 | B2 | * | 9/2004 | Page et al. | 710/8 |
| 7,069,373 | B2 | * | 6/2006 | Teng | 710/310 |
| 7,222,201 | B2 | * | 5/2007 | Augustin et al. | 710/105 |
| 8,090,894 | B1 | * | 1/2012 | Khodabandehlou et al. | 710/313 |
| 8,131,890 | B1 | * | 3/2012 | Bajpai | 710/31 |
| 8,140,719 | B2 | * | 3/2012 | Lauterbach et al. | 710/36 |
| 2003/0217254 | A1 | * | 11/2003 | Page et al. | 713/2 |
| 2004/0093454 | A1 | * | 5/2004 | Teng | 710/310 |
| 2004/0133708 | A1 | * | 7/2004 | Augustin et al. | 710/8 |
| 2005/0044286 | A1 | * | 2/2005 | Lim et al. | 710/15 |
| 2008/0147898 | A1 | * | 6/2008 | Freimuth et al. | 710/8 |
| 2008/0225735 | A1 | * | 9/2008 | Qiu et al. | 370/252 |
| 2008/0228962 | A1 | * | 9/2008 | Ong | 710/35 |
| 2008/0320181 | A1 | * | 12/2008 | Lauterbach et al. | 710/38 |
| 2009/0013097 | A1 | * | 1/2009 | Hsiao et al. | 710/16 |
| 2009/0216920 | A1 | * | 8/2009 | Lauterbach et al. | 710/36 |

FOREIGN PATENT DOCUMENTS

| JP | 2004-054437 | 2/2004 | G06F 13/38 |
| KR | 1020050021602 A | 3/2005 | G06F 13/12 |

OTHER PUBLICATIONS

'USB Feature Specification: Shared Endpoints' Revision 1.0, SystemSoft Corporation and Intel Corporation, Oct. 27, 1999.*
"Universal Serial Bus Specification," Apr. 27, 2000, pp. i, ii, and 32-34.*
'Universal Serial Bus Specification' Revision 2.0, Apr. 27, 2000, pp. 34-35.*
'USB Feature Specification: Dynamic Logical-Device' by Intel Corporation, Revision 1.0, Oct. 27, 1999.*
'The Universal Serial Bus Specification' Revision 2.0, Apr. 27, 2000, pp. i, ii, 18, 19, 65, 82, 83.*

* cited by examiner

*Primary Examiner* — Steven Snyder

(57) ABSTRACT

A semiconductor device includes at least one endpoint communicating with a host, and an endpoint controller dividing each of the at least one endpoint into a majority of sub-endpoints and performing numbering to each of the divided sub-endpoints. The endpoint controller transmits a packet generated by the host to any one of the sub-endpoints.

8 Claims, 16 Drawing Sheets

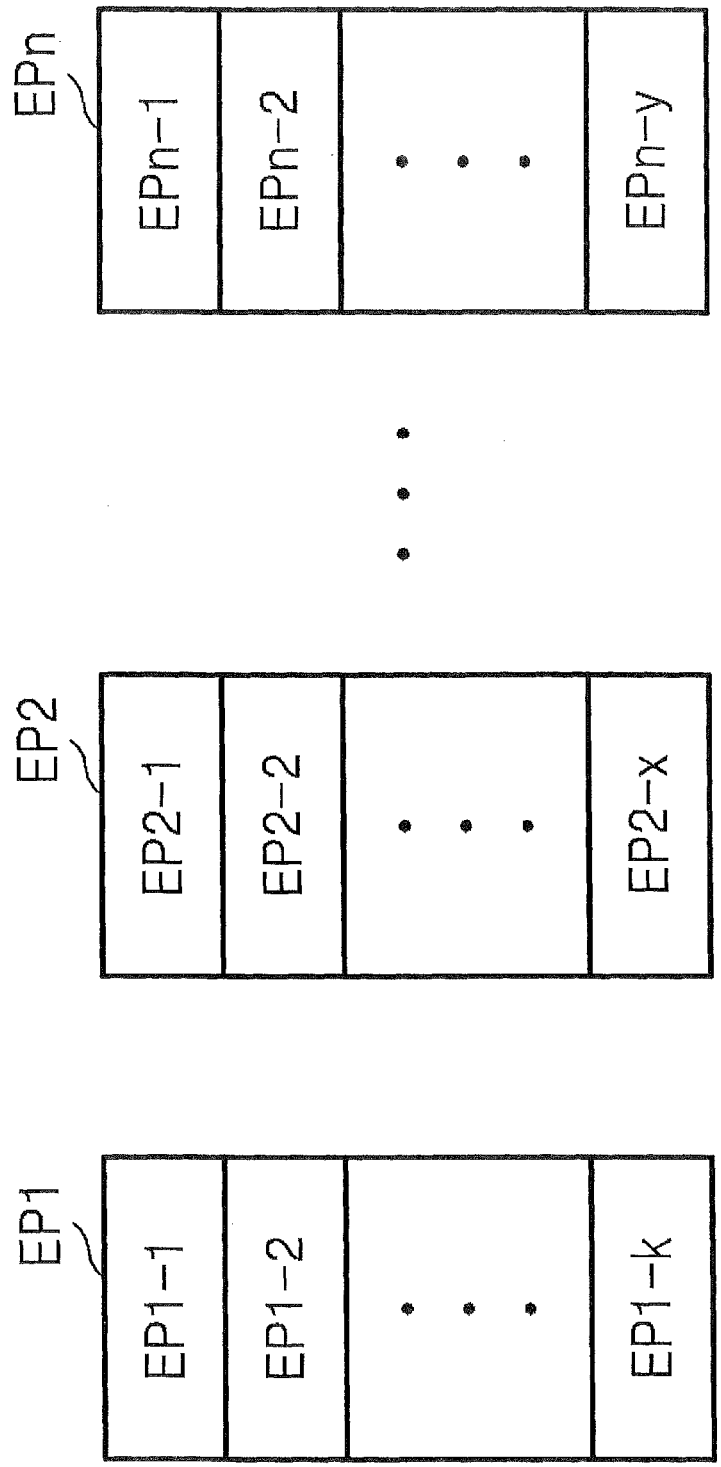

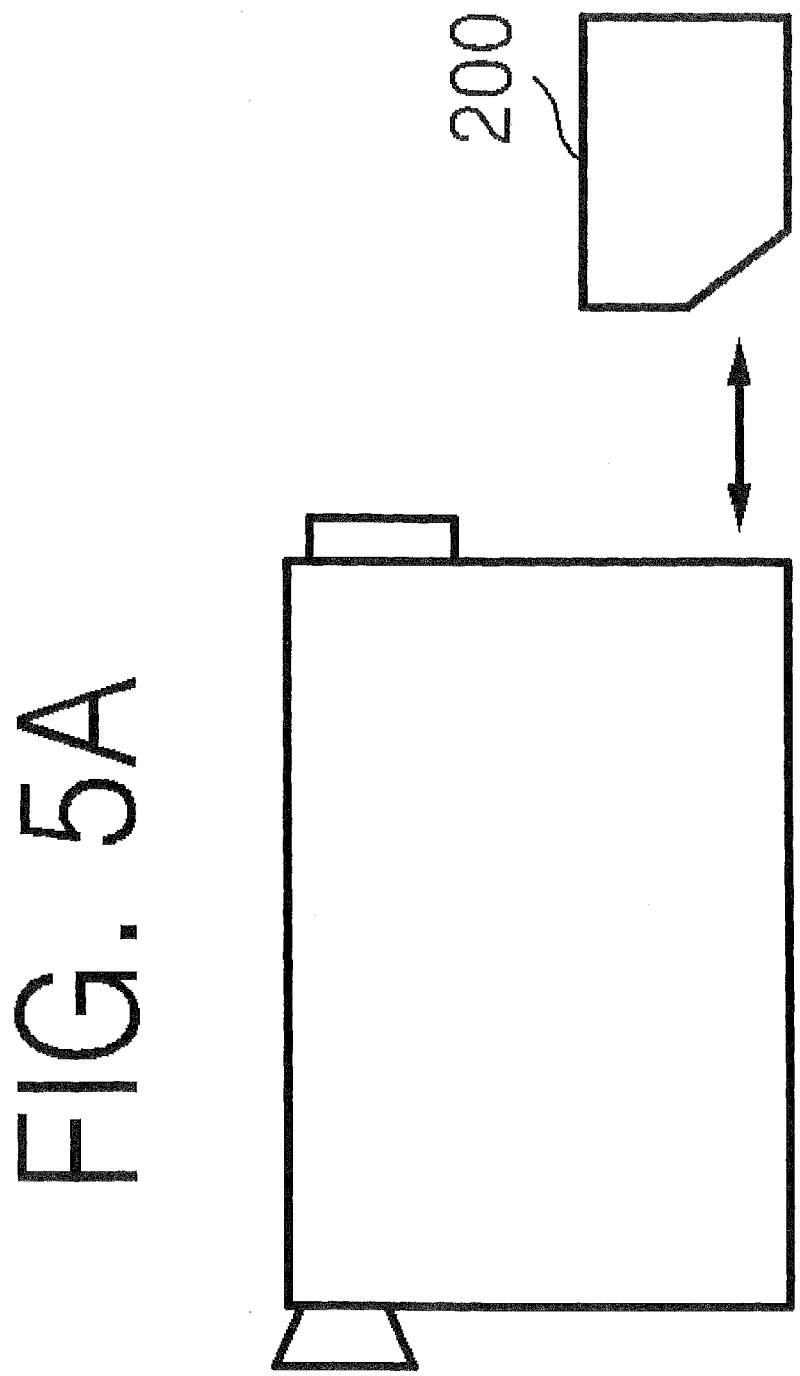

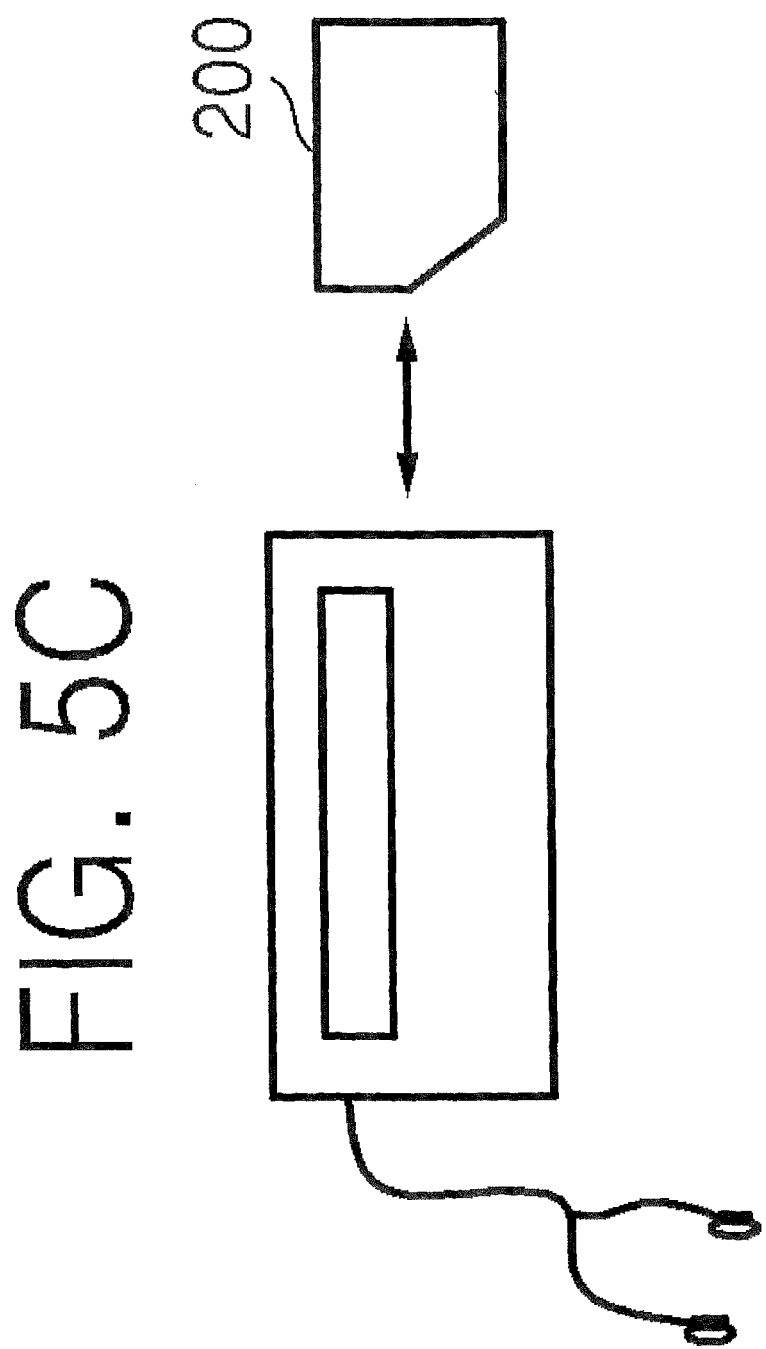

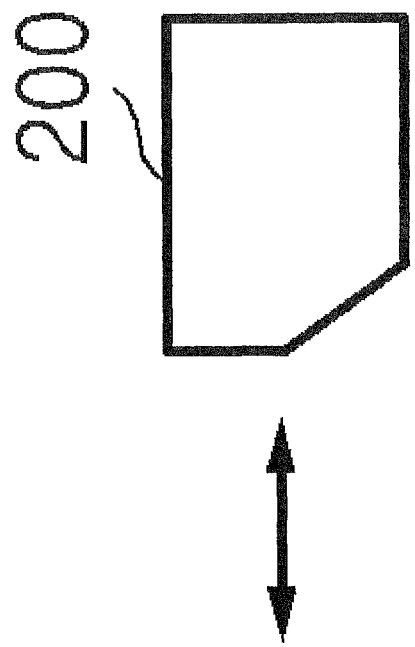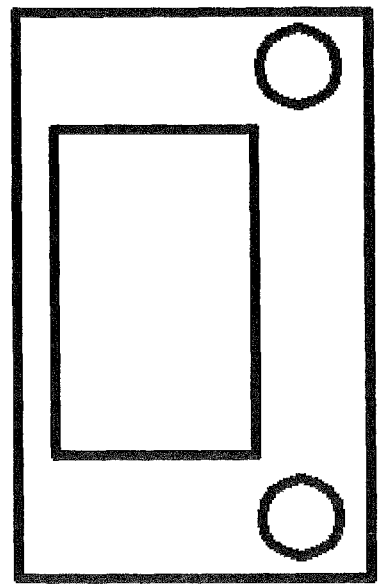
FIG. 5D

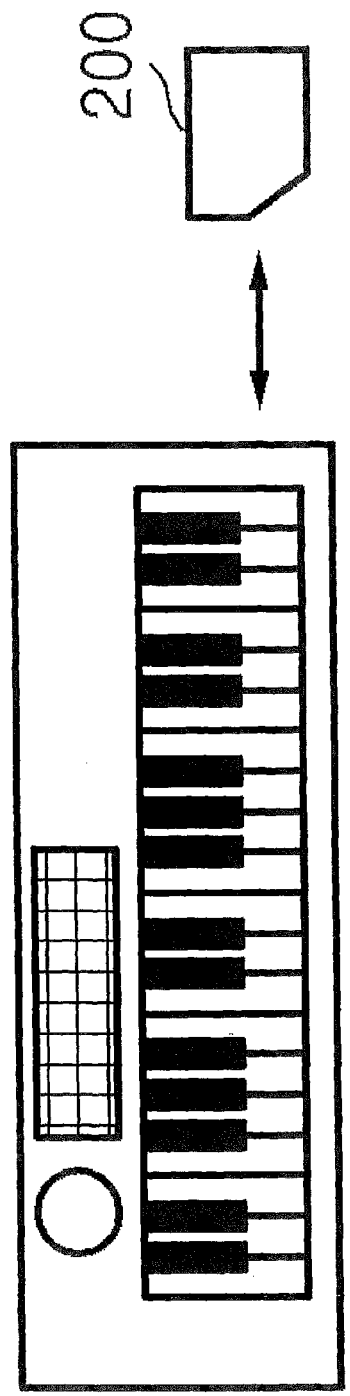

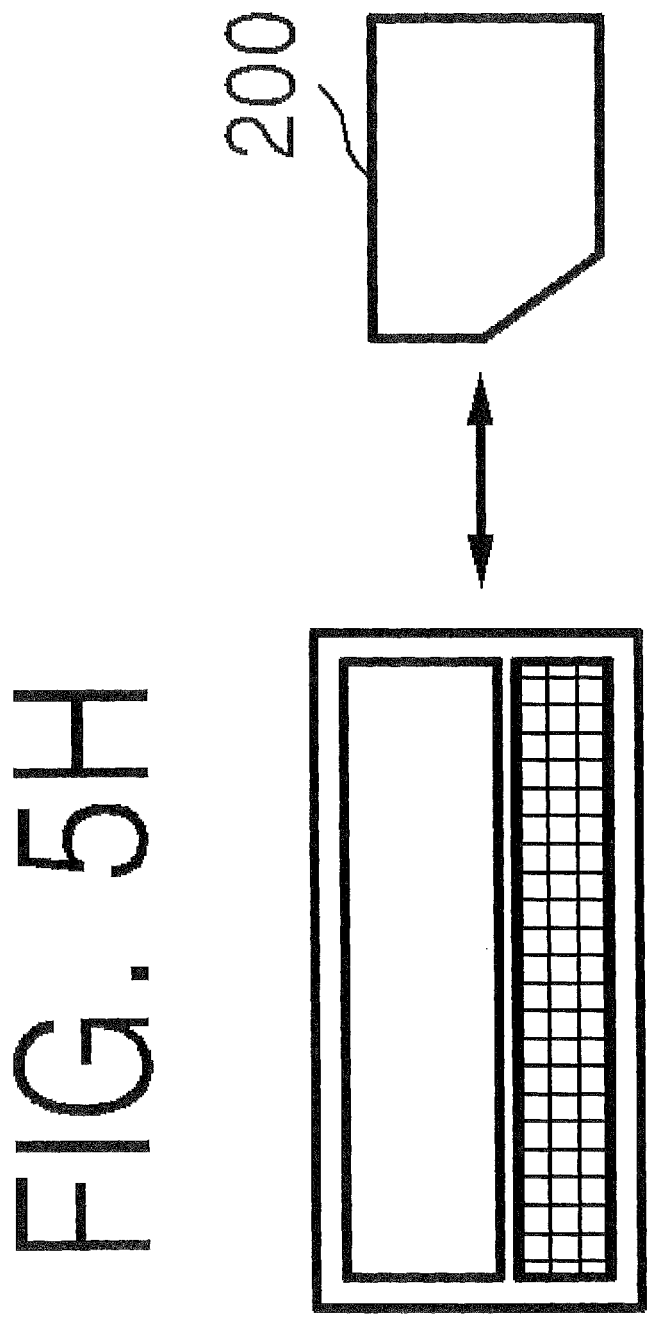

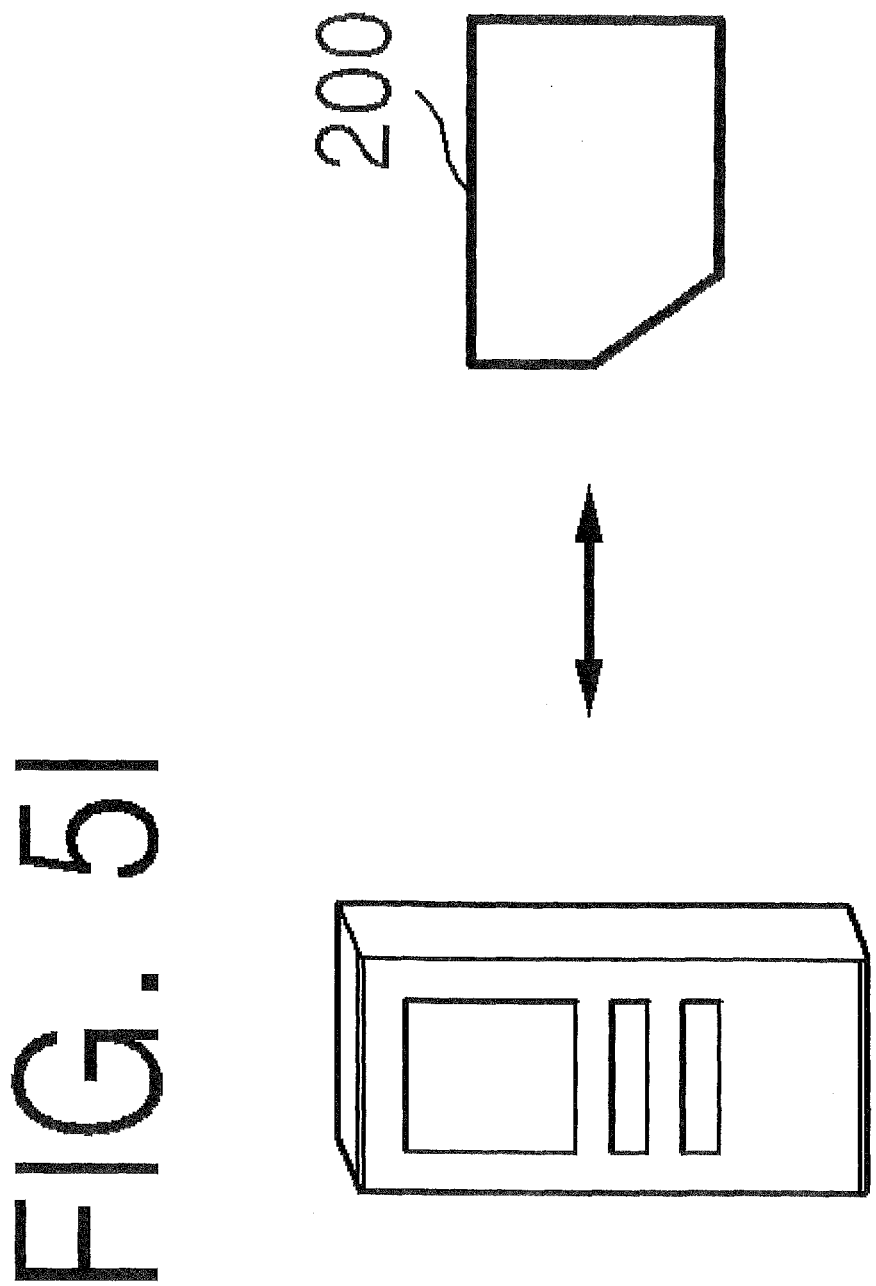

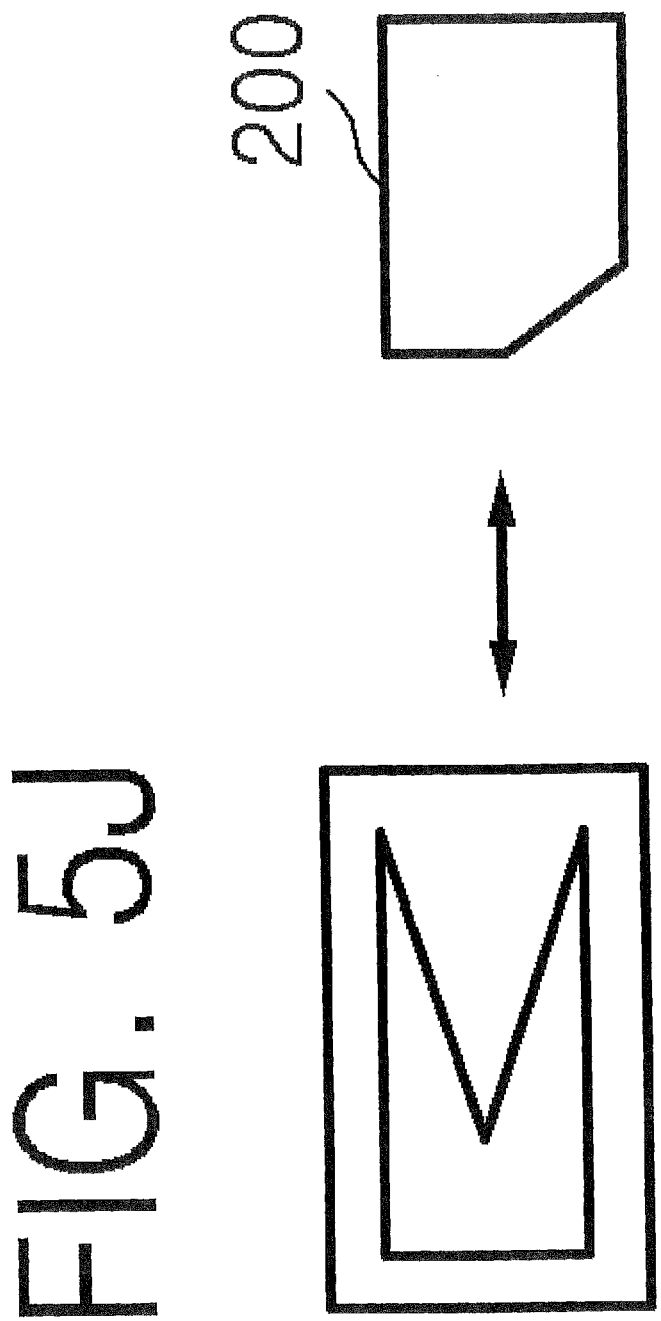

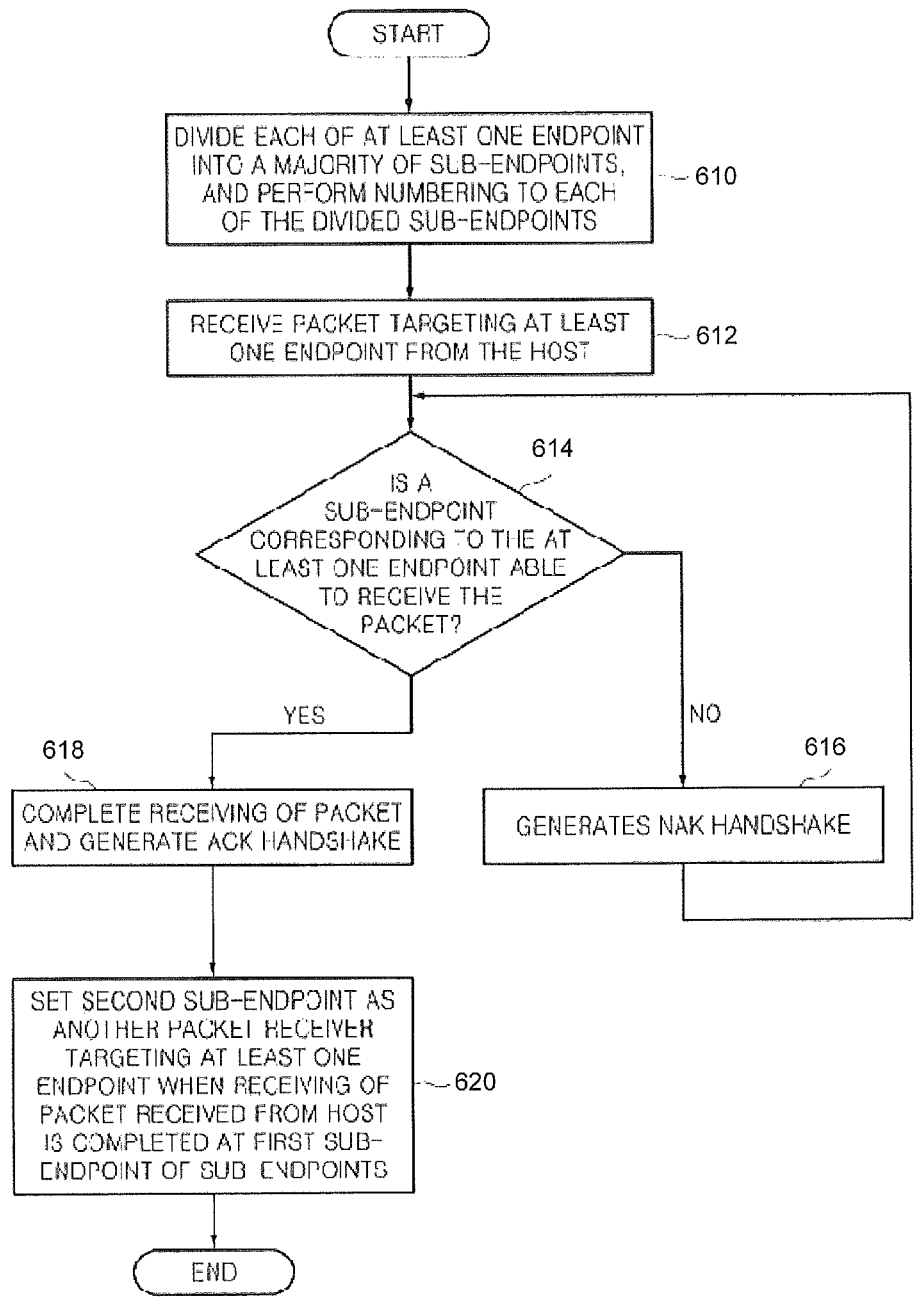

SEMICONDUCTOR DEVICES CAPABLE OF DIVIDING ENDPOINT INTO MAJORITY OF SUB-ENDPOINTS

CROSS-REFERENCE TO RELATED APPLICATIONS

This application claims the benefit of Korean Patent Application No. 10-2009-0018847, filed on Mar. 5, 2009, in the Korean Intellectual Property Office, the disclosure of which is hereby incorporated herein by reference as if set forth fully herein.

BACKGROUND

The present invention relates to semiconductor devices.

Universal serial bus (USB) is an industrial standard for connecting peripherals, such as keyboards, mice, monitors, web cameras, joysticks, and storages, to a host, and may provide the peripherals with a plug and play function and also may transmit data at high speed.

A plurality of USB devices may be connected to the host under the USB environment. Each USB device may include a plurality of endpoints. Each endpoint may communicate with the host through a pipe that is an independent channel.

Recently, USB devices have been implemented by a variety of applications, for example, a large capacity storage device, or a chip/smart card interface devices (CCID), which may rely on a plurality of endpoints. However, the number of endpoints provided in the USB device may be limited due to a chip size problem.

SUMMARY

Some embodiments of the present invention provides semiconductor devices capable of dividing an endpoint into a majority of sub-endpoints, and methods of dividing an endpoint into a majority of sub-endpoints.

According to some embodiments of the present invention a semiconductor device may include at least one endpoint that is configured to communicate with a host; and an endpoint controller that is configured to divide each of the at least one endpoints into a majority of sub-endpoints and to number each of the divided sub-endpoints. Some embodiments provide that the endpoint controller is further configured to transmit a packet generated by the host to any one of the sub-endpoints.

In some embodiments, the endpoint controller generates a NAK handshake when the sub-endpoint is not able to receive the packet. Some embodiments provide that the endpoint controller receives a number of an endpoint, to which the host desires to transmit the packet, of the at least one endpoint, and transmits the packet to any one of the sub-endpoints corresponding to the received endpoint number.

In some embodiments, the endpoint controller divides the at least one endpoint into first and second sub-endpoints, and controls a destination of the packet to be the first sub-endpoint or the second sub-endpoint in response to the packet corresponding to the at least one endpoint being received from the host. Some embodiments provide that the endpoint controller generates an ACK handshake in response to the first sub-endpoint or the second sub-endpoint completely receiving the packet. In some embodiments, the endpoint controller controls a destination of a second packet corresponding to the at least one endpoint to be the second sub-endpoint in response to the first sub-endpoint completely receiving a first packet received from the host. Some embodiments provide that the endpoint controller generates a NAK handshake in response to the first sub-endpoint receiving the second packet at around the completion of the receiving of the first packet.

In some embodiments, the device is operated in a first mode in which the endpoint receives a first packet transmitted by the host and a second mode in which the endpoint transmits a second packet to the host. The endpoint controller may change the mode of the first sub-endpoint receiving the first packet, from the first mode to the second mode, in response to the operation of the first mode being completed, and the mode of the second sub-endpoint transmitting the second packet, to the first mode, in response to the operation of the second mode being completed.

Some embodiments provide that the endpoint controller generates a NAK handshake in response to the host requesting a change to the second mode before the first sub-endpoint is changed from the first mode to the second mode.

In some embodiments, the endpoint controller includes a numbering unit that is configured to divide each of the at least one endpoints into a majority of sub-endpoints and to number each of the divided sub-endpoints and a NAK transmission unit that is configured to generate a NAK handshake in response to the sub-endpoint numbered by the numbering unit not being able to receive the packet generated by the host.

Some embodiments provide that the device includes a universal serial bus (USB) device.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention. Exemplary embodiments of the inventive concept will be more clearly understood from the following detailed description taken in conjunction with the accompanying drawings in which:

FIG. 2 illustrates methods of dividing at least one endpoint using the endpoint controller of FIG. 1;

FIGS. 5A-5J illustrate electronic devices including the electronic system of FIG. 4; and FIG. 6 is a flowchart for explaining operations in which the semiconductor device of FIG. 1 receives a packet according to some embodiments of the present invention.

DETAILED DESCRIPTION

Figure 1:
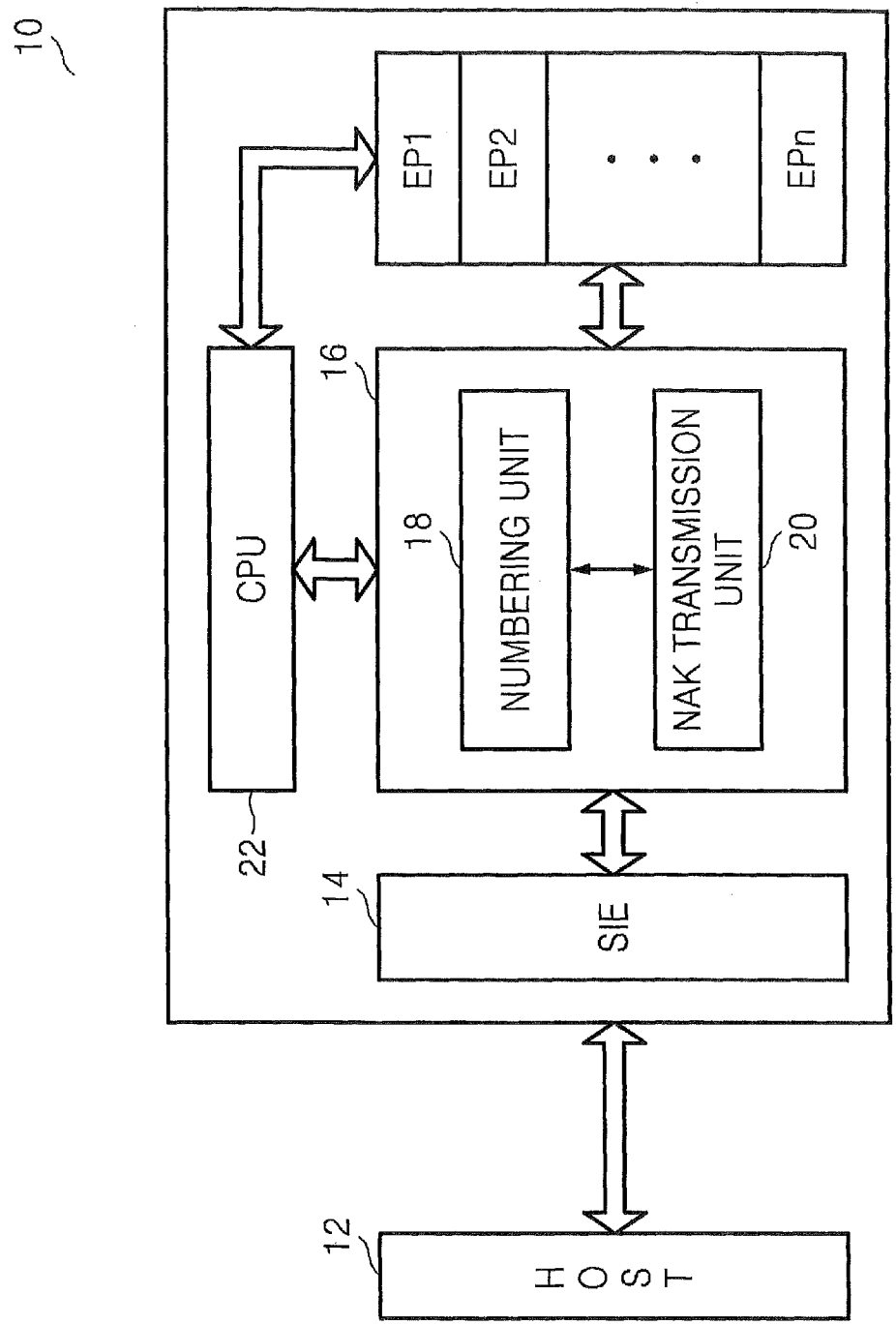
FIG. 1 is a block diagram of a semiconductor device according to some embodiment of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Figure 3A:
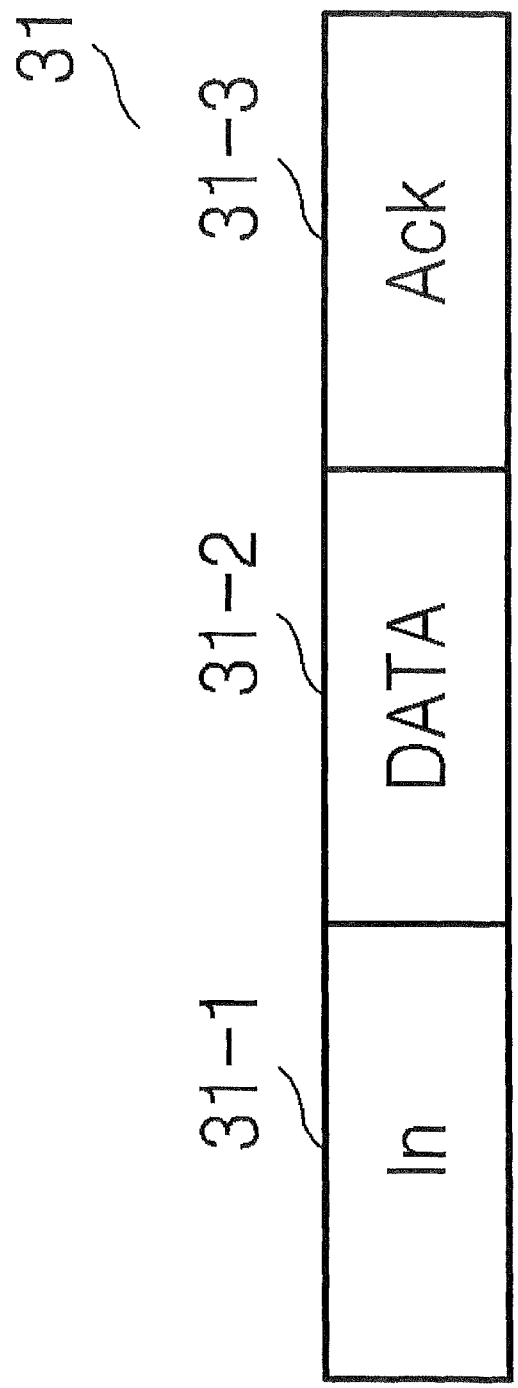
FIGS. 3A and 3B illustrate the frame of a packet transceived between the host and the semiconductor device of FIG. 1.
Figure 3B:
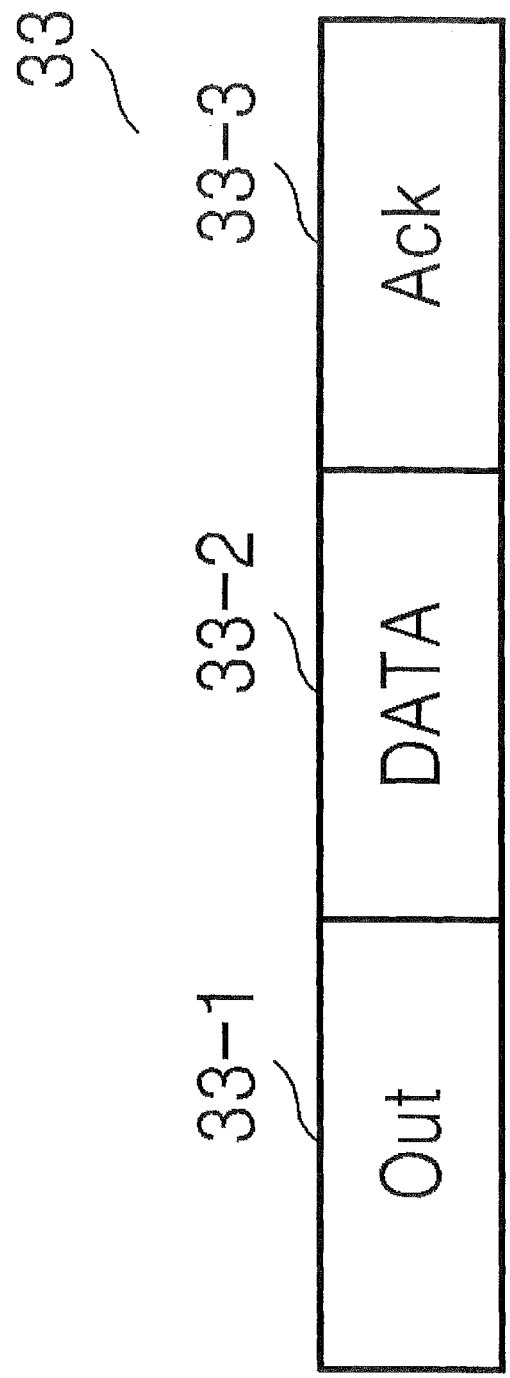

FIG. 1 is a block diagram of a semiconductor device 10 according to some embodiments of the present invention. FIG. 2 illustrates methods of dividing at least one endpoint using the endpoint controller 16 of FIG. 1. FIGS. 3A and 3B illustrate the frame of a packet transceived between the host 12 and the semiconductor device 10 of FIG. 1.

Referring to FIGS. 1-3B, the semiconductor device 10 may include a serial interface engine (SIE) 14, an endpoint controller 16, at least one endpoint EP1-EPn, and a CPU 22. Some embodiments provide that the semiconductor device 10 may be a universal serial bus (USB) device. The logical structure of the semiconductor device 10 may be regarded as a set of the endpoints EP1-EPn. The SIE 14 may connect the semiconductor device 10 to a hub or the host 12 according to a USB protocol and make a physical signal connection between the semiconductor device 10 and the host 12.

The endpoint controller 16 may divide each of the at least one endpoint EP1-EPn into a majority of sub-endpoints and perform numbering, that is, assigning numbers, to each of a plurality of divided sub-endpoints EP1-1-EP1-k, EP2-1-EP2-x, EPn-1-EPn-y. That is, the endpoint controller 16 may assign a plurality of logical numbers to a single physical endpoint, for example, EP1.

The endpoint controller 16 may store a result of numbering to each of the divided sub-endpoints EP1-1-EP1-k, EP2-1-EP2-x, EPn-1-EPn-y. For example, the endpoint controller 16, as illustrated in FIG. 2, may divide the first endpoint EP 1 into the first to k-th sub-endpoints EP1-1-EP1-k and perforin numbering to each of the divided sub-endpoints EP1-1-EP1-k.

That is, when the semiconductor device 10 is implemented by a large capacity storage device, at least two endpoints are needed. As the endpoint controller 16 divides a single endpoint, for example, the first endpoint EP1, into the first through k-th logical sub-endpoints EP1-1-EP1-k, the large capacity storage device may be implemented by a single physical endpoint Also, the endpoint controller 16 may divide the second endpoint EP2 into the first to x-th sub-endpoints EP2-1-EP2-x and perform numbering to each of the divided sub-endpoints EP2-1-EP2-x, and the n-th endpoint EPn into the first to y-th sub-endpoints EPn-1-EPn-y and perform numbering to each of the divided sub-endpoints EPn-1-EPn-y. Each of the sub-endpoints EP1-1-EP1-k, EP2-1-EP2-x, EPn-1-EPn-y may be implemented by a buffer (not shown). Some embodiments provide that the buffer may be a First In, First Out (FIFO) memory.

Each of the sub-endpoints EP1-1-EP1-k, EP2-1-EP2-x, . . . , EPn-1-EPn-y may be characteristically defined according to a bus access frequency, a bandwidth, an end point number, an error processing sequence, the maximum packet size that an endpoint can transmit or receive, an endpoint transmission type, and/or a data transmission direction. Also, the endpoint controller 16 may transmit and/or assign a packet generated by the host 12 to a corresponding one of the sub-endpoints EP1-1-EP1-k, EP2-1-EP2-x, . . . , EPn-1-EPn-y.

In detail, when receiving a packet targeting the first endpoint EP1 from the host 12, the endpoint controller 16 may control to provide that the packet may be transmitted to any one of, for example, the first sub-endpoint EP1-1, of the first to k-th sub-endpoints EP1-1-EP1-k that comprise the first endpoint EP1. For example, when the host 12 generates a write or read request for the first endpoint EP1, the endpoint controller 16 may control to provide that any one of, for example, the first sub-endpoint EP1-1 of the first to k-th sub-endpoints EP1-1-EP1-k forming the first endpoint EP1 may perform a write or read operation.

When the transmission of a packet to the sub-endpoint EP1-1 is completed, the endpoint controller 16 may generate a positive response and/or an ACK handshake. When the transmission of a packet to the sub-endpoint EP1-1 fails, the endpoint controller 16 may generate a negative response and/or a NAK handshake.

FIG. 3A illustrates the frame of a packet transceived between the host 12 and the semiconductor device 10 of FIG. 1. A first packet 31 transmitted from the host 12 to the semiconductor device 10 may be configured as a frame as illustrated in FIG. 3A. In detail, the first packet 31 may include a first token portion 31-1, a first data portion 31-2, and a first handshake portion 31-3.

The first token portion 31-1 may include information on the transmission direction of the first packet 31, that is, a transmission direction from the host 12 to the semiconductor device 10. The first data portion 31-2 may include data transmitted by the host 12.

Some embodiments provide that the first handshake portion 31-3 may include a receiving response to the receiving of the first packet 31 of the semiconductor device 10. The receiving response may be a positive response and/or an ACK handshake that may denote that the first packet 31 is received without an error. The receiving response may be a negative response and/or a NAK handshake that may denote the generation of an error.

Also, a second packet 33 transmitted from the semiconductor device 10 to the host 12 may be configured as a frame as illustrated in FIG. 3B. In detail, the second packet 33 may include a second token portion 33-1, a second data portion 33-2, and a second handshake portion 33-3.

The second token portion 33-1 may include information on the transmission direction of the second packet 33, that is, a transmission direction from the semiconductor device 10 to the host 12. The second data portion 33-2 may include data transmitted by the semiconductor device 10.

Also, the second handshake portion 33-3 may include a receiving response to the receiving of the second packet 33 of the host 12. The receiving response may be an ACK handshake denoting that the second packet 33 is received without an error, or a NAK handshake that is a receiving response to the generation of an error.

When a corresponding sub-endpoint, for example, the first sub-endpoint EP1-1, of the sub-endpoints EP1-1-EP1-k, EP2-1-EP2-x, EPn-1-EPn-y is not able to receive the packet generated by the host 12, the endpoint controller 16 may generate a NAK handshake. Thus, when the divided sub-endpoint, for example, the first sub-endpoint EP1-1 is not able to receive a packet, the endpoint controller 16 of the semiconductor device 10 according to the some embodiments herein may generate the NAK handshake so that safety in the packet transmission may be improved.

An endpoint, for example, the first sub-endpoint EP1, may be operated in a first mode, or an OUT mode, to receive the first packet 31 transmitted by the host 12 and in a second mode, or an IN mode, to transmit the second packet 33 to the host 12. After the completion of the operation in the first mode, the endpoint controller 16 may change the mode of the first sub-endpoint EP1-1 that has received the first packet 31, to the second mode.

In some embodiments, after the completion of the operation in the second mode by the endpoint or the first sub-endpoint EP1, the endpoint controller 16 may change the mode of the first sub-endpoint EP1-1 that has transmitted the second packet 33, to the first mode. When a second mode change request, that is, a packet transmission request, is generated by host 12 before the mode of the first sub-endpoint EP1-1 is changed to the second mode after the completion of the operation in the first mode, the endpoint controller 16 may generate the NAK handshake.

Also, when the first sub-endpoint EP1-1 completely receives the first packet 31 received from the host 12, the endpoint controller 16 may control to provide that a receiving destination of the second packet 33 with respect to the at least one endpoint EP1-EPn is the second sub-endpoint EP1-2.

The endpoint controller 16 may include a numbering unit 18 and a NAK transmission unit 20. The numbering unit 18 may divide each of the end points EP1-EPn into a majority of sub-endpoints and perform numbering for each of the divided sub-endpoints EP1-1-EP1-k, EP2-1-EP2-x, . . . , EPn-1-EPn-y. The numbering unit 18 performs numbering to each of the sub-endpoints as follows.

When the sub-endpoint, for example, the first sub-endpoint EP1-1, which is numbered by the numbering unit 18, is not able to receive a packet generated by the host 12, the NAK transmission unit 20 may generate a NAK handshake as described above. Each of the at least one endpoints EP1-EPn, which may include an endpoint physically having a number, may be divided by the endpoint controller 16 into the sub-endpoints EP1-1-EP1-k, EP2-1-EP2-x, . . . , EPn-1-EPn-y, and then numbered. Also, each of the at least one endpoints EP1-EPn may have an individual identification number and may be identified by a combination with a device address.

The transmission type between the host 12 and the semiconductor device 10 may be determined according to the characteristic of an endpoint, which may be described in a descriptor. Some embodiments provide that the frequency of bus access, latency, bandwidth, the number of an endpoint, and/or the maximum size of a packet may be described in the descriptor.

The CPU 22 may perform intrinsic functions provided by the semiconductor device 10, for example, functions of a keyboard, a mouse, a monitor, a web camera, a joystick, and/or a storage, based on the packet received from the host 12 via the at least one endpoint EP1-EPn.

Figure 4:
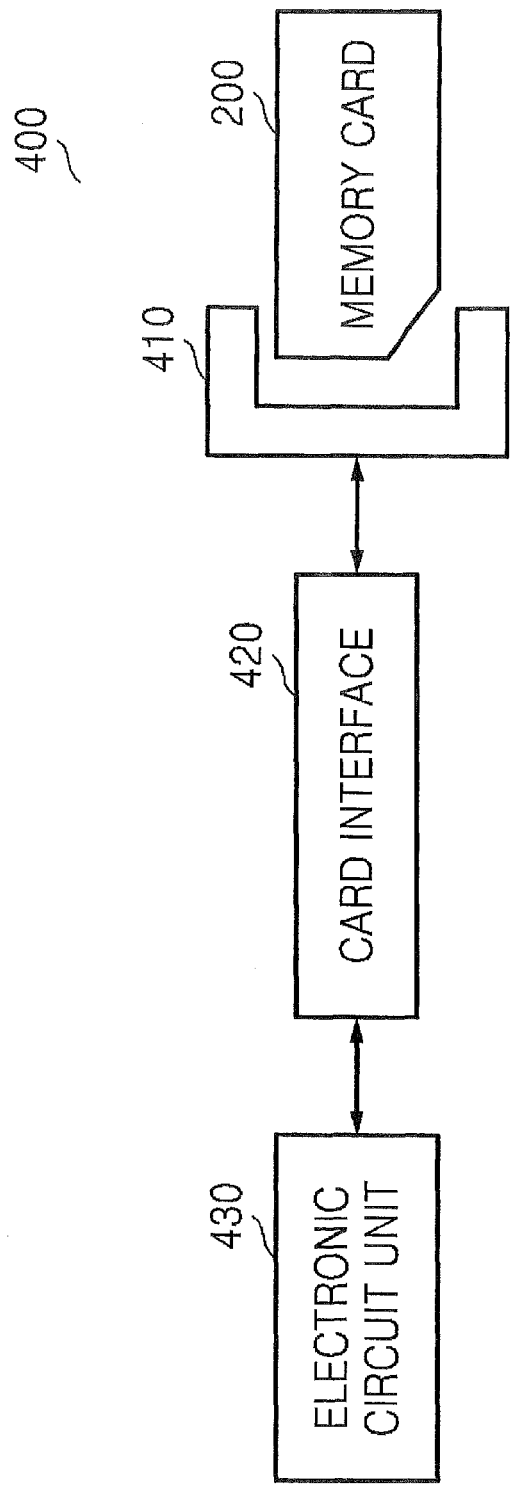
FIG. 4 is a functional block diagram of an electronic system having the semiconductor device of FIG. 1.
Figure 5B:
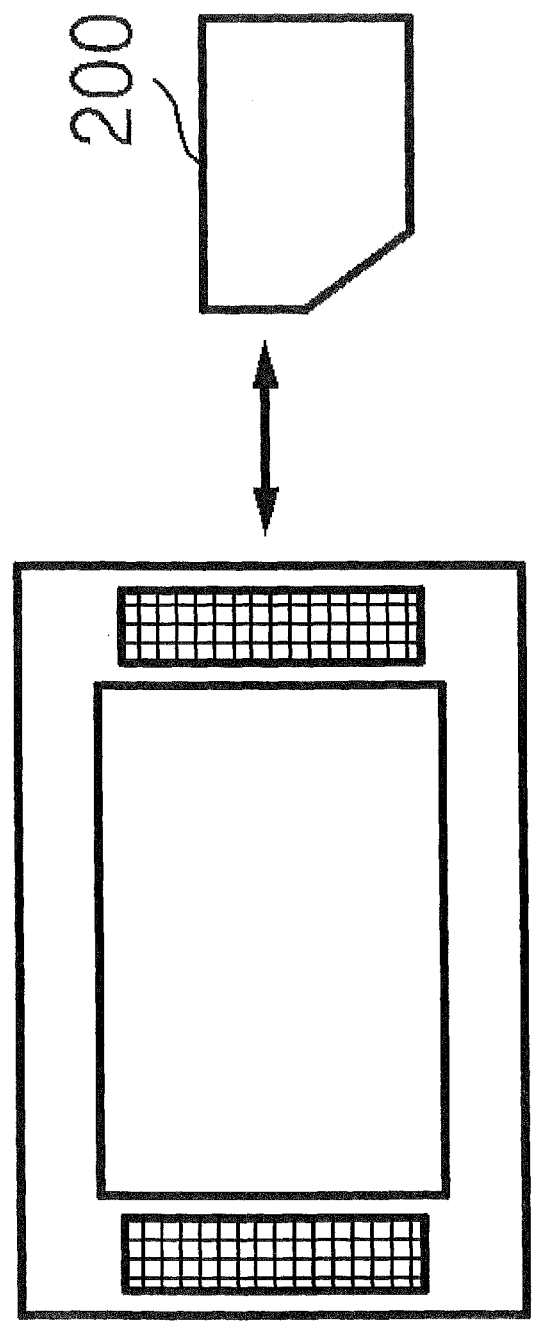
Figure 5F:
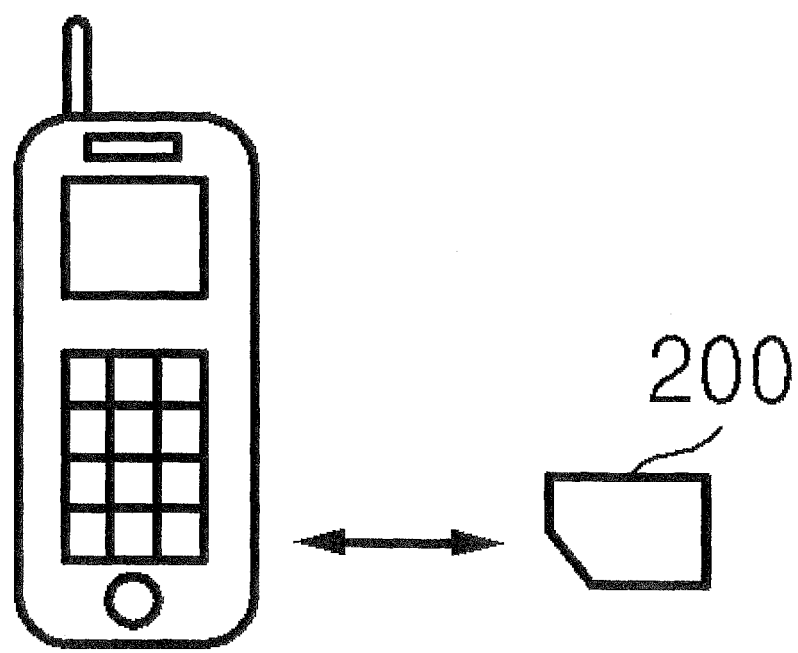
Figure 5G:
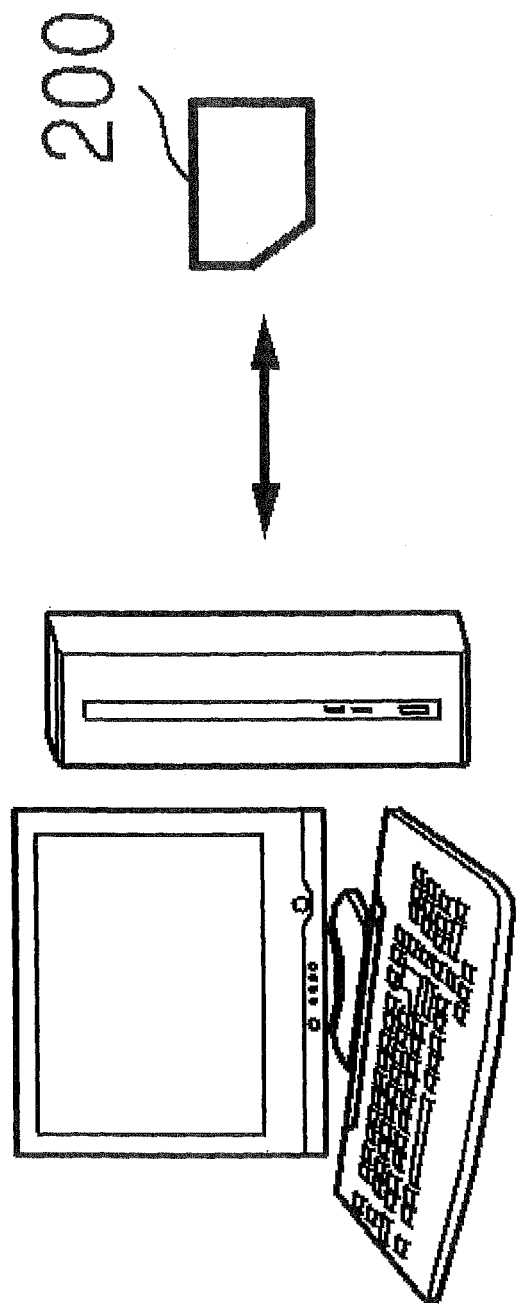

FIG. 4 is a functional block diagram of an electronic system having the semiconductor device 10 of FIG. 1. FIGS. 5A-5J illustrate electronic devices including the electronic system of FIG. 4.

Referring to FIGS. 4 through 5J, the semiconductor device 10 may be included in a memory card 200. In some embodiments, the memory card may be a smart card, a USB device, a compact flash, a memory stick, a multimedia card, and/or an SD card, among others.

The memory card 200 may electronically be connected with memory slot 410, receive data output from an electronic circuit unit 420 through a card interface 420, and restore the data. Some embodiments provide that the memory card 200 may transmit the stored data to the electronic circuit unit. Some embodiments provide that the data restored in the memory card 200 may be image data and/or audio data, among others.

For example, referring to FIG. 5A, the host may be video camera. In such embodiments, the electronic circuit unit 430 may include CMOS image sensor, image processor, and/or digital signal processor and may be configured to transmit data generated in the electronic circuit unit 430 through the card interface 420.

Referring FIGS. 5B through 5J, the memory card 200 may be included in the television, MP3 player, game console, electronic instrument, Personal Computer, Personal Digital Assistant, voice recorder, PC card and so on. FIG. 6 is a flowchart for explaining a process that the semiconductor device of FIG. 1 receives a packet.

Referring to FIGS. 1, 2, and 6, the endpoint controller 16 may divides each of the at least one endpoint EP1-EPn into the sub-endpoints EP1-1-EP1-k, EP2-1-EP2-x, ..., EPn-1-EPn-y, and may perform numbering to each of the divided sub-endpoints EP1-1-EP1-k, EP2-1-EP2-x, ..., EPn-1-EPn-y (block 610).

The endpoint controller 16 receives a packet targeting the at least one endpoint EP1-EPn from the host 12 (block 612), and determines whether a sub-endpoint, for example, the first sub-endpoint EP1-1, corresponding to the at least one endpoint EP1-EPn is able to receive the packet (block 614). If the sub-endpoint, for example, the first sub-endpoint EP1-1, is not able to receive the packet, the endpoint controller 16 generates a NAK handshake (block 616), and may perform the operation described with reference to block 14 again.

If the sub-endpoint, for example, the first sub-endpoint EP1-1, is able to receive the packet, the endpoint controller 16 transmits the packet to the sub-endpoint. When the receiving of the packet is completed at the sub-endpoint, the endpoint controller 16 may generate an ACK handshake (block 618).

When the receiving of the packet received from the host 12 is completed at the first sub-endpoint EP1-1 of the sub-endpoints EP1-1-EP1-k, EP2-1-EP2-x,. . ., EPn-1-EPn-y, the endpoint controller 16 may set the second sub-endpoint EP1-2 as a destination of another packet targeting the at least one endpoint EP1-EPn (block 620).

As described above, in the semiconductor device according to the present inventive concept, since one endpoint is divided into a majority of sub-endpoints, the number of endpoints that may be implemented within a limited chip size may be maximized. Also, when the divided sub-endpoint is not able to receive a packet, the semiconductor device according to some embodiments of the present invention may generate a NAK handshake to improve safety in the packet transfer.

Exemplary embodiments of the present invention can be embodied in hardware, software, firmware or combination thereof.

Some embodiments of the present invention can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable transmission medium can transmit carrier waves or signals (e.g., wired or wireless data transmission through the Internet). The computer-readable recording medium can also be distributed over network coupled computer systems so that the computer-readable code is stored and executed in a distributed fashion. Also, functional programs, codes, and code segments to accomplish the present inventive concept can be easily construed by programmers skilled in the art to which the present inventive concept pertains.

While the present invention has been particularly shown and described with reference to some exemplary embodiments thereof, it will be understood that various changes in form and details may be made therein without departing from the spirit and scope of the following claims.

What is claimed is:

1. A semiconductor device comprising:
    at least one endpoint that is configured to communicate with a host; and
    an endpoint controller that is configured to divide each of the at least one endpoints into a majority of sub-endpoints and to number each of the divided sub-endpoints,
    wherein the endpoint controller is further configured to transmit a packet generated by the host to any one of the sub-endpoints,
    wherein the endpoint controller generates a negative acknowledgement (NAK) handshake when the sub-endpoint is not able to receive the packet, and
    wherein the endpoint controller is configured to divide the at least one endpoint into first and second sub-endpoints, and to control a destination of the packet to be the first sub-endpoint or the second sub-endpoint in response to the packet corresponding to the at least one endpoint being received from the host;
    wherein the endpoint controller receives a number of an endpoint, to which the host desires to transmit the packet, of the at least one endpoint, and transmits the packet to any one of the sub-endpoints corresponding to the received endpoint number.

2. The semiconductor device of claim 1, wherein the endpoint controller generates an acknowledgement (ACK) handshake in response to the first sub-endpoint or the second sub-endpoint completely receiving the packet.

3. The semiconductor device of claim 2, wherein the endpoint controller controls a destination of a second packet corresponding to the at least one endpoint to be the second sub-endpoint in response to the first sub-endpoint completely receiving a first packet received from the host.

4. The semiconductor device of claim 3, wherein the endpoint controller generates the negative acknowledgement (NAK) handshake in response to the first sub-endpoint receiving the second packet substantially at completion of the receiving of the first packet.

5. The semiconductor device of claim 1,
    wherein the device is operated in a first mode in which the endpoint receives a first packet transmitted by the host;
    wherein the device is operated in a second mode in which the endpoint transmits a second packet to the host, and
    wherein the endpoint controller changes the mode of the first sub-endpoint receiving the first packet, from the first mode to the second mode, in response to the operation of the first mode being completed, and the mode of the second sub-endpoint transmitting the second packet, to the first mode, in response to the operation of the second mode being completed.

6. The semiconductor device of claim 5, wherein the endpoint controller generates the negative acknowledgement (NAK) handshake in response to the host requesting a change to the second mode before the first sub-endpoint is changed from the first mode to the second mode.

7. The semiconductor device of claim 1, wherein the endpoint controller comprises:
    a numbering unit that is configured to divide each of the at least one endpoints into a majority of sub-endpoints and to number each of the divided sub-endpoints; and
    a negative acknowledgement (NAK) transmission unit that is configured to generate a NAK handshake in response to the sub-endpoint numbered by the numbering unit not being able to receive the packet generated by the host.

8. The semiconductor device of claim 1, the device comprising a universal serial bus (USB) device.

* * * * *